J. D. Dale,
Cutter Head.
N° 11,778.   Patented Oct. 10, 1854.
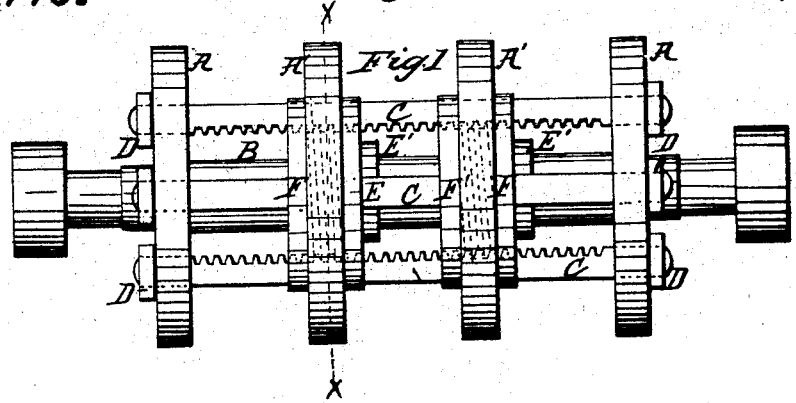
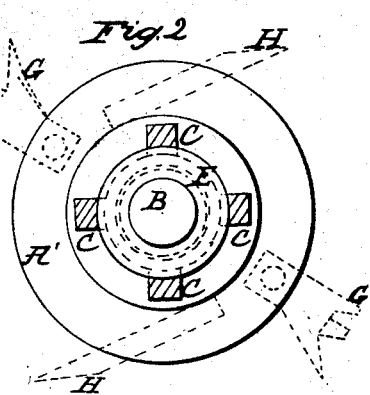
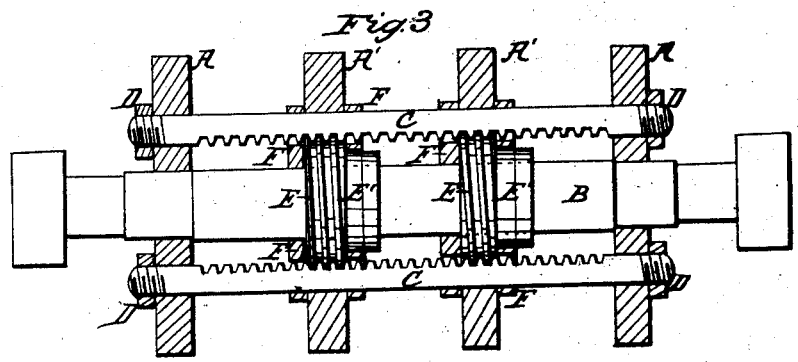

UNITED STATES PATENT OFFICE.

JOHN D. DALE, OF PHILADELPHIA, PENNSYLVANIA.

CUTTER-HEAD FOR PLANING-MACHINES, &c.

Specification of Letters Patent No. 11,778, dated October 10, 1854.

*To all whom it may concern:*

Be it known that I, JOHN D. DALE, of the city and county of Philadelphia and State of Pennsylvania, have invented a new and useful Improvement in the Cutter-Heads of his Patented and other Molding and Planing Machines, which is described as follows, reference being had to the annexed drawings of the same, making part of this specification.

Figure 1, is an elevation of a set of cutter heads, suitable for his patented machine, on the improved plan. Fig. 2, is a vertical section of the same, at the line $x\ x$ of Fig. 1. Fig. 3, is a vertical transverse section of the same, showing an elevation of the racks or cogged bars and screws for meshing in the same.

Similar letters in the figures indicate corresponding parts.

The nature of this invention and improvement consists in so securing the cutter heads on their shaft as to enable the heads between the outer ones to be gradually moved over the shaft toward either end to adapt them to any size of molding or planing cutter that may be desired to be secured between them, and thus readily regulate the width of the moldings formed from the board or plank passing under the cutters, and the cutters to be attached and detached with facility and despatch.

To enable others skilled in the art to make and use my invention I will proceed to describe its construction and operation.

The outside disks or heads A are secured near the ends of the shaft B, by means of four or any desired number of horizontal racks or cogged bars C, passing through openings in the inner heads A', and through openings in the outer heads, and having screws cut on their ends on which are screwed nuts D, by which the said outer heads A, are held firmly against shoulders on the shaft B, and racks or cogged bars C. These racks or cogged bars, serve as guides to the heads A', in their lateral movements from or toward each other to correspond with the width of the cutters, and have teeth or cogs formed on their sides next the shaft, into which works or meshes the thread of a screw formed on the periphery of a hub E, surrounding the shaft B, and capable of moving around, and laterally over the same, which hub is confined within a circular space of the movable head, concentric with the periphery of the same, and of such size as to cause the screw portion E, of the hub, which is the same thickness as the portion of the head next the periphery, to exactly fit within the space, with the proper degree of looseness as to enable the hub to readily revolve and operate on the cogs. The other portion E' of the hub is of less diameter than the screw portion, and passes through a circular opening formed in circular plates F, F', forming shoulders or projections on the flat surfaces of the heads, two of which plates F', may be cast with the heads in the form of projections, or secured by screws, or other convenient means, and the other two F, are cast separately and secured by screws, or in any other desired manner, so as to enable the screw portion E, of the hub to be inserted in its space and confined therein between the plates.

The smaller portion E', of the hub, is serrated or notched, or otherwise made rough to be easily grasped by the fingers and thumb, to turn the hub, and projects a short distance beyond the outer surface of the plate E, to enable the operator to lay hold of it with the fingers and thumb, to move the heads along the shaft to secure the cutters between them or for other purpose. In case it is found necessary, this projecting portion E, of the hub may be made in the form of a polygon, or otherwise adapted to receive a wrench or other instrument to turn the same.

The stationary and movable heads A, A', have cutting teeth G, on their peripheries, for dividing or cutting the board or plank at the required distance, to divide or separate the moldings as they are formed, in the same manner as described in my patented molding machine, and represented by dotted lines in Fig. 2, and the molding cutters, H, also represented by dotted lines in the same figure, are secured between the heads, by inserting their ends in sockets or grooves formed in the flat surfaces of the heads, and screwing the movable heads against their ends, so as to firmly embrace them between said heads, by turning the hubs E, having screws on their peripheries, and causing the threads of the same to operate on the teeth or cogs of the racks or cogged bars, and thus to move the heads A', and projecting plates F, F', on their flat surfaces, and hubs inclosed within, laterally over the shaft to suit any sized cutter required for the molding desired to be cut. In this manner, different sized cutters, of any relative proportion, can be inserted and secured between the heads so as to produce corresponding sized moldings at the same time.

Having thus fully described my invention, what I claim as new and desire to secure by Letters Patent is,

The combination and arrangement of the screw hubs E, E', inclosed in the concentric spaces formed in the heads A', and capable of being turned by the hand or otherwise racks or cogged bars C, acting as supports and guides to the heads, and movable heads A', substantially in the manner and for the purpose herein set forth.

JOHN D. DALE.

Witnesses:
 GEORGE C. HELMBOLD,
 CYRUS W. FOSS.